N. LIDDELL.
Corn-Planter.

No 63,401

Patented Apr. 2. 1867.

Witnesses:
Benj. C. Howe
J. B. Gaylord

Inventor:
Noyes Liddell.

United States Patent Office.

NOYES LIDDELL, OF LAFAYETTE, NEW YORK.

Letters Patent No. 63,401, dated April 2, 1867.

IMPROVEMENT IN CORN PLANTER.

*The Schedule referred to in these Letters Patent and making part of the same.*

TO ALL WHOM IT MAY CONCERN:

Be it known that I, NOYES LIDDELL, of Lafayette, in the county of Onondaga, and State of New York, have invented a new and improved Machine for Planting Corn and other seeds; and I do hereby declare that the following is a full and exact description thereof, reference being had to the accompanying drawings and to the figures and letters of reference marked thereon.

Each letter refers to like parts in each figure.

Figure 1:
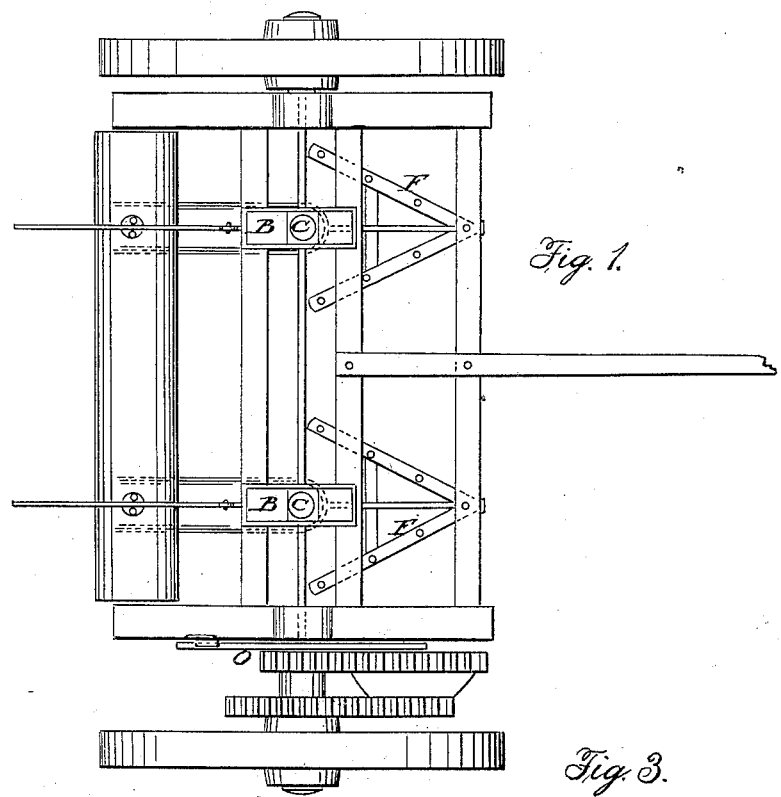
Figure 1 is a plan of the machine as viewed from a point above it.
Figure 3:
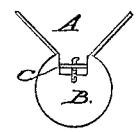
Figure 3 is a section of the feed-wheel or dropper.
Figure 2:
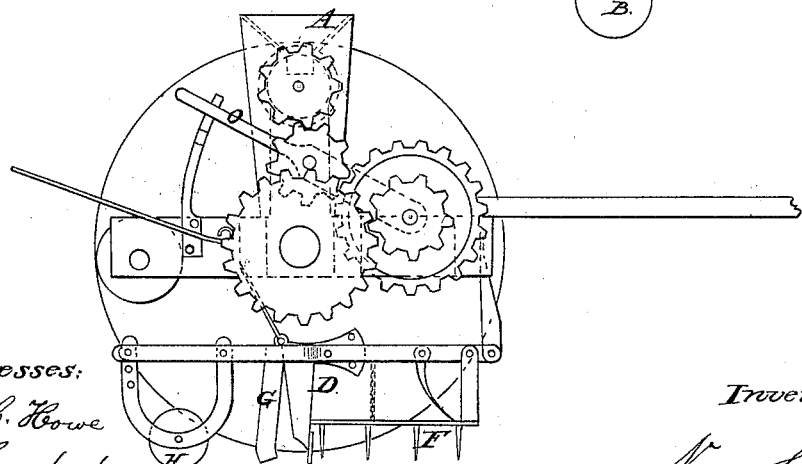
Figure 2 is an end view representing a transverse section of the working parts of the machine, except the apparatus for measuring out and dropping the required amount of seed.

A is the hopper, used for receiving the seed and supplying it to the feed-wheel or dropper as fast as it is used. B is the feed-wheel, containing one or more cups, with an adjustable bottom, C, for the purpose of regulating the size of the cup and measuring out the required quantity of seed. The edge of the cup is bevelled so as to prevent it from cracking the kernels of grain. This feed-wheel or dropper is sometimes constructed with one or more grooves running around the wheel instead of the cup. The seed is conducted from the feed-wheel B to the drill or hollow tooth D by means of a tube of any convenient construction. In the bottom of the drill is placed a wedge-shaped bar for the purpose of scattering the seed as it falls through the tube. F is a small harrow, so constructed that it will clear away all loose stone and hard lumps of earth from the track of the drill. G is a scraper for the purpose of thoroughly covering any seed that may be left on the surface by the drill. H is a roller for the purpose of regulating the depth of planting, and also for the purpose of pressing the earth closely upon the seed. The feed-wheel B is driven by gear-wheels connecting with the wheel or wheels that support the machine and roll on the ground. O is a lever for the purpose of throwing the feed-wheel in or out of gear. One of the gear-wheels contains a pawl and ratchet so as to allow the machine to be backed up without turning the feed-wheel backwards.

The advantages of this machine are—

First. The quantity of seed dropped at one time can be regulated to suit any required size of kernel by adjusting the movable bottom C of the cup in the feed-wheel B, as described.

Second. By means of the V-shaped harrow all obstructions to the growth of the grain or plants are cleared away from the track of the drill, and the ground is loosened up fresh and mellow, so as to make the operation of covering the seed more certain. In other seed drills the loose stone, sods, and hard lumps of earth are left to fall into the track of the drill, and thus prevent and retard the growth of many of the young plants.

Third. By means of the lever O the feed-wheel can be thrown out of gear in turning around, and thrown into gear so as to drop the corn in hills that will be in rows both ways at right angles across the field, and by means of the pawl and ratchet the machine can be backed up without turning the feed-wheel backward.

What I claim as my own invention, and desire to secure by Letters Patent, is—

The hopper A, seeding cylinder B, cup C, lever O with its attached gear-wheels, the harrow F, tooth D, coverer G, and roller H, when constructed, arranged, and operating as and for the purpose specified.

NOYES LIDDELL.

Witnesses:
  B. J. C. HOWE,
  J. B. GAYLORD.